(12) United States Patent
Klimczak et al.

(10) Patent No.: US 12,741,413 B2
(45) Date of Patent: Sep. 22, 2026

(54) APPARATUS, SYSTEM AND METHOD OF HEAT FILTERING FOR ADDITIVE MANUFACTURING

(71) Applicant: 3D Print Innovations, LLC, Millburn, NJ (US)

(72) Inventors: Scott Klimczak, St. Petersburg, FL (US); Luke Rodgers, St. Petersburg, FL (US)

(73) Assignee: 3D Print Innovations, LLC

( * ) Notice: Subject to any disclaimer, the term of this patent is extended or adjusted under 35 U.S.C. 154(b) by 157 days.

(21) Appl. No.: 17/417,054

(22) PCT Filed: Dec. 18, 2019

(86) PCT No.: PCT/US2019/067219
§ 371 (c)(1),
(2) Date: Jun. 21, 2021

(87) PCT Pub. No.: WO2020/132093
PCT Pub. Date: Jun. 25, 2020

(65) Prior Publication Data

US 2022/0072785 A1 Mar. 10, 2022

Related U.S. Application Data

(60) Provisional application No. 62/782,729, filed on Dec. 20, 2018.

(51) Int. Cl.
*B29C 64/165* (2017.01)
*B22F 10/14* (2021.01)
(Continued)

(52) U.S. Cl.
CPC ............ *B29C 64/165* (2017.08); *B22F 10/14* (2021.01); *B22F 12/41* (2021.01); *B29C 64/286* (2017.08); *B33Y 30/00* (2014.12)

(58) Field of Classification Search
CPC ... B29C 64/286; B29C 64/264; B29C 64/295; B29C 64/00; B29C 64/165; B22F 12/00; B22F 10/00
See application file for complete search history.

(56) References Cited

U.S. PATENT DOCUMENTS 5,738,817 A 4/1998 Danforth
5,740,051 A 4/1998 Sanders, Jr.
(Continued)

FOREIGN PATENT DOCUMENTS

CN 207549495 6/2018
EP 2699406 A2 2/2014
(Continued)

OTHER PUBLICATIONS

Ankno, T. "Machine Translation of JPH10323906A: Optical Shaping Device using Lamp." EPO. Espacenet. 2023 (Year: 2023).*
(Continued)

*Primary Examiner* — Seyed Masoud Malekzadeh
*Assistant Examiner* — Jonathan B Woo
(74) *Attorney, Agent, or Firm* — Riverside Law LLP

(57) ABSTRACT

An apparatus, system and method for additive manufacturing. The apparatus, system and method include at least a print bed having thereon powdered print material; a dispersing head suitable to disperse one or more heat-actuated agents onto the powdered print material as indicated by a print plan; a broadband infrared energy source suitable to pass over the print bed so as to actuate the dispersed agent; and a heat energy filter interfaced to the broadband energy source so as to filter the actuating energy to one or a range of wavelengths of the infrared energy source that is less than the available broadband.

7 Claims, 3 Drawing Sheets

(51) Int. Cl.

| | |
|---|---|
| ***B22F 12/41*** | (2021.01) |
| ***B29C 64/286*** | (2017.01) |
| ***B33Y 30/00*** | (2015.01) |

(56) References Cited

U.S. PATENT DOCUMENTS

| | | | | |
|---|---|---|---|---|
| 6,051,179 | A | 4/2000 | Hagenau | |
| 6,767,499 | B1 * | 7/2004 | Hory | B29C 64/393 264/434 |
| 10,661,514 | B2 | 5/2020 | Talgorn | |
| 10,710,301 | B2 | 7/2020 | Feng | |
| 10,717,265 | B2 | 7/2020 | Ng | |
| 11,084,227 | B2 | 8/2021 | Yui | |
| 11,254,068 | B2 | 2/2022 | Ng | |
| 2014/0036455 | A1 | 2/2014 | Eduardo | |
| 2014/0043630 | A1 | 2/2014 | Buser | |
| 2015/0174824 | A1 | 6/2015 | Gifford | |
| 2015/0190967 | A1 | 7/2015 | Stava | |
| 2015/0266238 | A1 | 9/2015 | Ederer et al. | |
| 2015/0273769 | A1 | 10/2015 | Korn | |
| 2016/0137838 | A1 * | 5/2016 | Rolland | G03F 7/027 264/401 |
| 2016/0311165 | A1 | 10/2016 | Mark | |
| 2017/0037674 | A1 | 2/2017 | Hooper | |
| 2017/0120332 | A1 * | 5/2017 | DeMuth | B23K 26/36 |
| 2017/0129012 | A1 | 5/2017 | Ishida | |
| 2017/0165920 | A1 | 6/2017 | Leavitt | |
| 2017/0176976 | A1 | 6/2017 | Burton | |
| 2017/0225390 | A1 | 8/2017 | Napadensky | |
| 2017/0239719 | A1 | 8/2017 | Buller | |
| 2017/0266883 | A1 | 9/2017 | Yuji | |
| 2017/0274595 | A1 | 9/2017 | Swartz | |
| 2018/0001550 | A1 * | 1/2018 | Zhao | B29C 64/153 |
| 2018/0111313 | A1 | 4/2018 | Murao | |
| 2018/0154438 | A1 | 6/2018 | Mark | |
| 2018/0154439 | A1 | 6/2018 | Mark | |
| 2018/0186075 | A1 * | 7/2018 | Hierro Domenech | B29C 64/286 |
| 2018/0200957 | A1 | 7/2018 | Krüger et al. | |
| 2018/0297272 | A1 | 10/2018 | Preston | |
| 2018/0319082 | A1 | 11/2018 | Barnes | |
| 2018/0345376 | A1 | 12/2018 | Page | |
| 2019/0047216 | A1 | 2/2019 | Emamjomeh | |
| 2019/0054689 | A1 * | 2/2019 | Rudisill | B29C 64/264 |
| 2021/0154770 | A1 | 5/2021 | Alf | |
| 2021/0197485 | A1 | 7/2021 | Woodlock | |

FOREIGN PATENT DOCUMENTS

| | | | | |
|---|---|---|---|---|
| EP | 2699406 | B1 | 2/2020 | |
| JP | 10323906 | A * | 12/1998 | |
| WO | 2012143923 | A2 | 10/2012 | |
| WO | 2017050388 | A1 | 3/2017 | |
| WO | WO-2017052682 | A1 * | 3/2017 | |
| WO | WO-2017131764 | A1 * | 8/2017 | B29C 64/165 |

OTHER PUBLICATIONS

International Search Report for PCT/US2019/067219, dated Jun. 25, 2020.

Written Opinion of the International Searching Authority for PCT/US2019/067219, dated Jun. 25, 2020.

EPO Communication pursuant to Article 94(3) issued in App. No. EP23199598, dated May 29, 2024, 5 pages.

EPO. "Search Opinion for EP 19900913". EPO. ESpacenet. 2023 (Year: 2023) 1 page.

EPO. "Supplementary Search Report for EP 19900913". EPO. ESpacenet. 2023 (Year: 2023) 1 page.

Extended European Search Report issued in App. No. EP23199598, dated Oct. 9, 2023, 8 pages.

International Search Report for PCT/US2019/067578, dated Jun. 25, 2020, 4 pages.

Jérémie Dumas et, "Bridging the gap: automated steady scaffoldings for 3D printing", ACM Transactions on Graphics, vol. 33, No. 4, pp. 1-10, 2014.

Office Action (Final Rejection) dated May 10, 2024 for U.S. Appl. No. 17/417,092 (pp. 1-23).

Office Action (Non-Final Rejection) dated Oct. 23, 2023 for U.S. Appl. No. 17/417,092 (pp. 1-22).

Written Opinion of the International Searching Authority for PCT/US2019/067578, dated Jun. 25, 2020, 3 pages.

Office Action (Final Rejection) dated Mar. 19, 2025 for U.S. Appl. No. 17/417,092 (pp. 1-8).

* cited by examiner

APPARATUS, SYSTEM AND METHOD OF HEAT FILTERING FOR ADDITIVE MANUFACTURING

CROSS-REFERENCE TO RELATED APPLICATIONS

The present application claims benefit of priority to International Application No. PCT/US2019/067219, filed Dec. 18, 2019, entitled: "Apparatus, System and Method of Heat Filtering for Additive Manufacturing," which claims priority to U.S. Provisional Application No. 62/782,729, filed Dec. 20, 2018, entitled: "Apparatus, System and Method of Heat Filtering for Additive Manufacturing," the entirety of which is incorporated herein by reference as if set forth in its entirety.

BACKGROUND

Field of the Disclosure

The present disclosure relates to additive manufacturing, and, more specifically, to an apparatus, system and method of heat filtering for additive manufacturing.

Description of the Background

Three-dimensional (3D) printing is any of various processes in which material is joined or solidified under computer control to create a three-dimensional object. The 3D print material is "added" onto a base, such as in the form of added liquid molecules or layers of powder grain or melted feed material, and upon successive fusion of the print material to the base, the 3D object is formed. 3D printing is thus a subset of additive manufacturing (AM).

A 3D printed object may be of almost any shape or geometry, and typically the computer control that oversees the creation of the 3D object executes from a digital data model or similar additive manufacturing file (AMF) file, i.e., a "print plan". Usually this AMF is executed on a layer-by-layer basis, and may include control of other hardware used to form the layers, such as lasers or heat sources.

There are many different technologies that are used to execute the AMF. Exemplary technologies may include: fused deposition modeling (FDM); stereolithography (SLA); digital light processing (DLP); selective laser sintering (SLS); selective laser melting (SLM); high speed sintering (HSS); inkjet print and/or particle jetting manufacturing (IPM); laminated object manufacturing (LOM); and electronic beam melting (EBM).

Some of the foregoing methods melt or soften the print material to produce the print layers. For example, in FDM, the 3D object is produced by extruding small beads or streams of material which harden to form layers. A filament of thermoplastic, wire, or other material is fed into an extrusion nozzle head, which typically heats the material and turns the flow on and off.

Other methods, such as laser or similar beam-based or sintering techniques, may heat or otherwise activate the print material, such as a print powder, for the purpose of fusing the powder granules into layers. For example, such methods may melt the powder using a high-energy laser to create fully dense materials that may have mechanical properties similar to those of conventional manufacturing methods. SLS, for example, uses a laser to solidify and bond grains of plastic, ceramic, glass, metal or other materials into layers to produce the 3D object. The laser traces the pattern of each layer slice into the bed of powder, the bed then lowers, and another layer is traced and bonded on top of the previous.

By way of contrast, other similar methods, such as IPM, may create the 3D object one layer at a time by spreading a layer of powder, and printing a binder in the cross-section of the 3D object. This binder may be printed using an inkjet-like process.

By way of further example, and as will be appreciated by the skilled artisan, high speed sintering (HSS) employs part formation through the use of heating lamps, such as infrared (IR) lamps. More specifically, a part for production is, virtually-speaking, "sliced" into layers in the print plan, as discussed throughout, and these virtual layers then become actual layers upon application of the IR by the print process to the treated areas of a print bed.

That is, HSS typically occurs using a "bed" of powdered print material. The print plan may select one or more locations within the powder bed that will serve as part generation locations. Each part layer is "printed" onto the part generation pattern in the powder bed using a heat-absorbing ink. In a typical process, a broadband IR lamp then delivers heat across the entire print bed. This heat is absorbed by the heat absorbing ink, thereby forming a part layer having only those shaped characteristics indicated by the pattern of the ink placed upon the powder bed, as referenced above.

The foregoing process then repeats, layer by layer, until the completed part is formed. The HSS process accordingly allows for highly refined designs that may allow for internal movement and similar interactions, even between internal aspects of a given part. Moreover, to allow for such refined patterning, an anti-heat agent, such as water, may also be placed at selected locations about the print boundaries for a given layer pattern, so as to prevent undesired absorption of heat by those layers and a consequent malformation of the part.

In accordance with the foregoing, part characteristics in HSS may be varied layer by layer, or even within layers, such as based on the inks used and/or the level of heat applied. Yet further, an entire bed may be used to create individual layer patterns for many parts with each single pass of the IR lamp across the print powder bed.

However, the known art of HSS suffers from several significant drawbacks. Chief among these is that the use of HSS is typically highly limited for print materials other than polyamides. This is the case due in large measure to the use of a broadband IR lamp that does not allow for the delivery of heat uniquely at given wavelengths, which specific wavelengths might allow for the targeted printing of various other materials responsive to those targeted wavelengths. That is, a broadband IR spectrum risks undesired activation of areas of a pattern which may be responsive to numerous frequencies across the IR spectrum, and risks a failure to deliver sufficient targeted heat at wavelengths necessary to activate certain types of print material, such as without "burning" aspects of a print pattern.

Moreover, some polymers absorb too much of the IR spectrum, such that difference in the absorption of energy in the IR ink jetted area (i.e., the print build) and the non-jetted area, i.e., the powder bed or supporting areas, is not a sufficient difference to differentially melt or heat the print build. Consequently, adverse growth of the part via melting of the supports, or without raising the support areas to a temperature that solidifies the support material area, may cause malformation, and further causes growth in unused particle size, thereby limiting the number of times that a powder can be recycled.

SUMMARY

The embodiments are and include at least an apparatus, system and method for additive manufacturing. The apparatus, system and method include at least a print bed having thereon powdered print material; a dispersing head suitable to disperse one or more heat-actuated agents onto the powdered print material as indicated by a print plan; a broadband infrared energy source suitable to pass over the print bed so as to actuate the dispersed agent; and a heat energy filter interfaced to the broadband energy source so as to filter the actuating energy to one or a range of wavelengths of the infrared energy source that is less than the available broadband.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
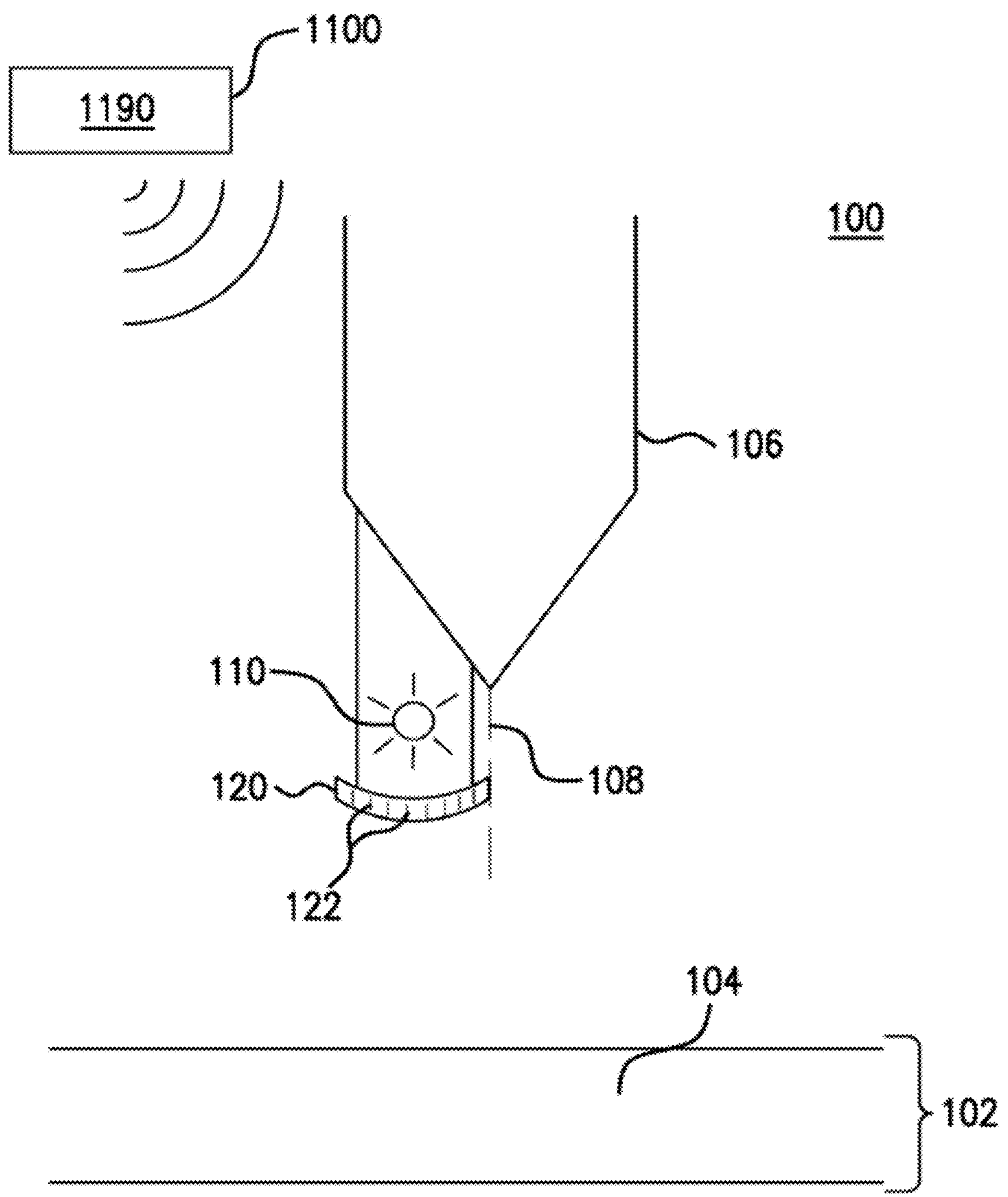
FIG. 1 is an illustration of a print system.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The disclosed apparatus, system and method provide a heat-energy filtering system for additive manufacturing printing. More particularly, a wavelength filter may be placed between the heat energy source and the print material it is designed to actuate.

As illustrated in FIG. 1, the embodiments may include a system 100 having aspects atypical of the HSS printer described above. For example, the aspects may include a print bed 102 having thereon powdered print material 104. Although the powdered print material 104 may include the polyamides referenced throughout, other print materials may be enabled for use with a disclosed HSS system 100 in the embodiments.

Further included may be a dispersing head 106 suitable to disperse one or more heat-actuated, such as IR-actuated, agents 108 onto the powder bed 104 in a shape and/or to depth indicated by the print plan 1190. And the system 100 includes a broadband heat energy source 110, such as an IR lamp, suitable to pass over the print bed 102 and, as it passes, actuate the dispersed agent 108 to thus form the desired pattern of the print plan 1190 in the powdered print material 104.

As also illustrated is a heat energy filter 120 which may be placed upon the heat energy lamp 110, i.e., between the IR lamp and the powder bed 104. This filter 120 may serve to filter one or a range of wavelengths of heat energy, such as IR light, from passing from the lamp to the powder bed 104, or may allow only a certain wavelength or range of wavelengths to pass from the IR lamp to the powder bed 104.

Moreover, in embodiments, the filter 120 may be manually or automatically adjustable 122, such as in accordance with the print plan 1190, such that the desired filtering to deliver only the desired range of heat energy wavelengths may be selected. As referenced, this may allow for modification of the heat energy, such as the IR. Such modification may be based on the polymer type of the powdered print material 104, for example, wherein the range of wavelengths delivered from the IR lamp may be solely those to which that particular polymer type is receptive.

More specifically, as, in known IR lamp embodiments, the IR heater is limited to being on or off, and hence cannot be "dimmed", i.e., tuned, on a case-by-case basis, the disclosed filter 120 may provide a low pass, band pass or high pass function only where filtering is needed and specific to the print material for which activation of the IR agent is desired. As such, a manual filter 120 may be "clickable", such as may be rotatable around a center axis to provide filtering for specific wavelengths for materials, such as may be specified in accordance with the markings at each clickable rotation available to the filter 120.

Likewise, the filter 120 may automatically adjust, such as in accordance with instructions to do so from the control system 1100 discussed herein. This automatic filtering may occur based upon knowledge of the material type per the print material 104 in the print plan 1190, or such as may occur based on manual entry of the print material type into the control system 1100, such as pre-print.

Thereby, the embodiments may allow for the use of a broad spectrum heat energy, such as IR, lamps to target particular prints for specific types or grades of material, or for specific pattern depths or refinement. Moreover, the wavelength limitations discussed herein may allow for the avoidance of an undesired rise or fall in a polymer temperature, such as may lead to clumping, part malformation, or the like.

By way of non-limiting example, specific grades of TPU, such as aromatic TPU, have historically presented a problem in the use of HSS printing. The embodiments allow for a selectable tuning of the applied IR energy only to those wavelengths most useful in a print using aromatic TPU print material.

By way of non-limiting example, in order to adjust to an optimally suitable wavelength for the use of a TPU print material, the user may select a print plan for the TPU material or enter, by way of example, "aromatic TPU" into the control system, to allow for an automatic adjustment of the filter 120 to a suitable wavelength for the selected TPU print material. Additionally and alternatively, the user may manually adjust the filtering placed in front of the IR lamp to a location known to or marked to correspond to aromatic TPU.

Figure 2:
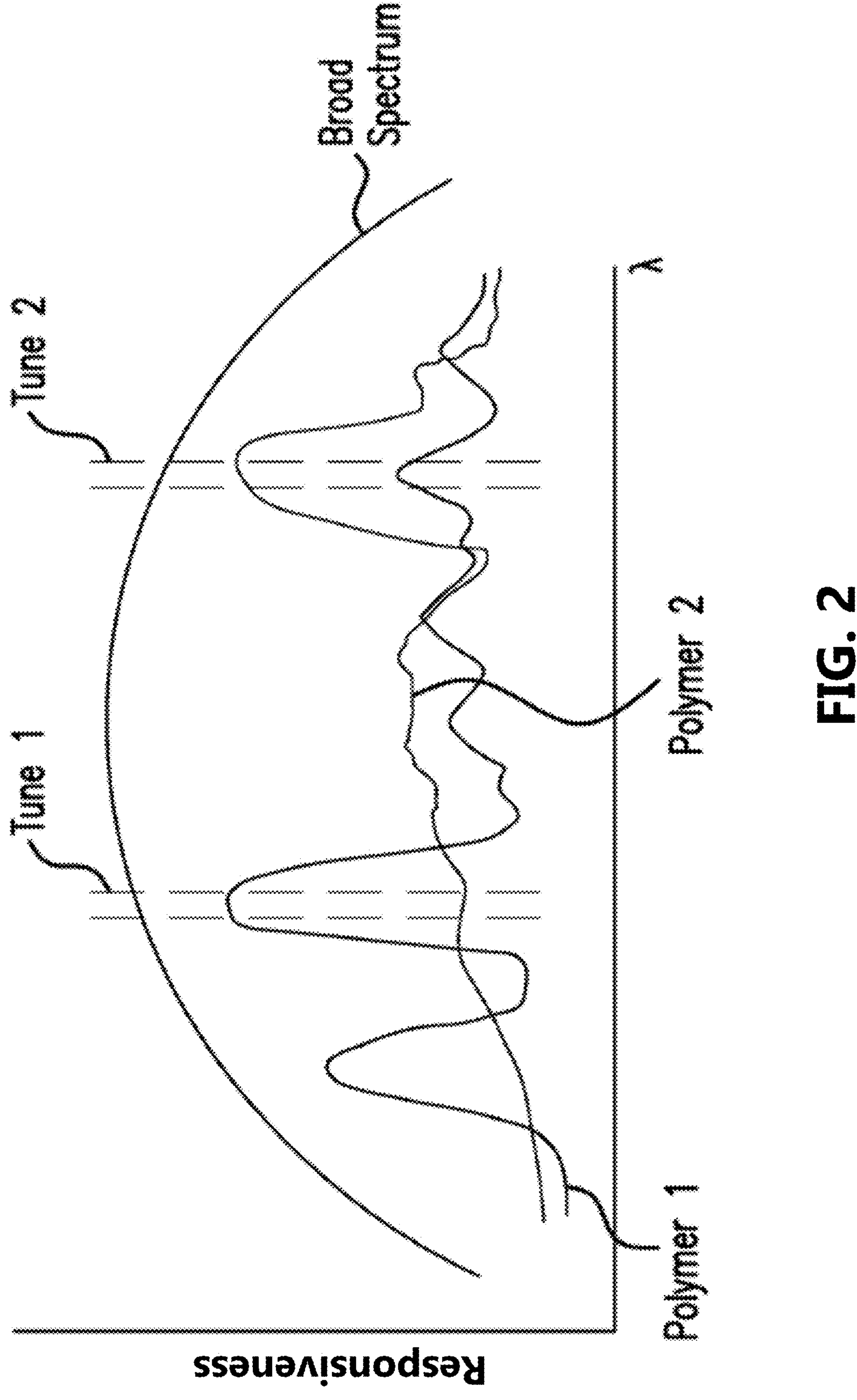
FIG. 2 is a graphical illustration of a print system.

FIG. 2 graphically illustrates the use of the embodiments. More specifically, FIG. 2 illustrates a broad spectrum IR energy curve representing the broadband IR energy delivered by an exemplary IR lamp. Also graphically shown are two curves representative of two different polymers, polymers 1 and 2. Each polymer curve includes one or more peaks correspond to the wavelength range at which that polymer print material is most responsive to the applied IR energy. As shown, the filtering system discussed above with respect to FIG. 1 includes, by way of non-limiting example, two selectable filtering ranges to which the filter may tune the applied IR energy, and each of these ranges may discretely correspond to the peak responsiveness wavelength of one of the two available print materials.

The filter discussed throughout must have performance characteristics suitable for use in the disclosed print environments. For example, the filter should not overheat or melt when subjected to the maximum energy from the heat energy supply, such as the IR lamp, to which the filter 120 is corresponded. Additionally, the filter should be fitted to allow for adjustability without impinging upon the powder bed, and to cover portions of the IR lamp or the entirety of the IR lamp, such may be necessary as in order to provide filtering only where it is desired, as appropriate.

In accordance with the above, the filter may be formed of suitable materials to perform as discussed. Further, the filter may be insulated or actively cooled, such as by one or more cooling fans, so as to avoid overheating. Yet further, the filters disclosed may be akin to wavelength filters in the known art suitable for the disclosed purpose, and thus may be employed in a manner similar to known wavelength filters. Accordingly and by way of non-limiting example, the disclosed wavelength filters may be optionally "stacked" to provide increased variations of available wavelength filtering or to provide band pass filtering, and so on.

Figure 3:
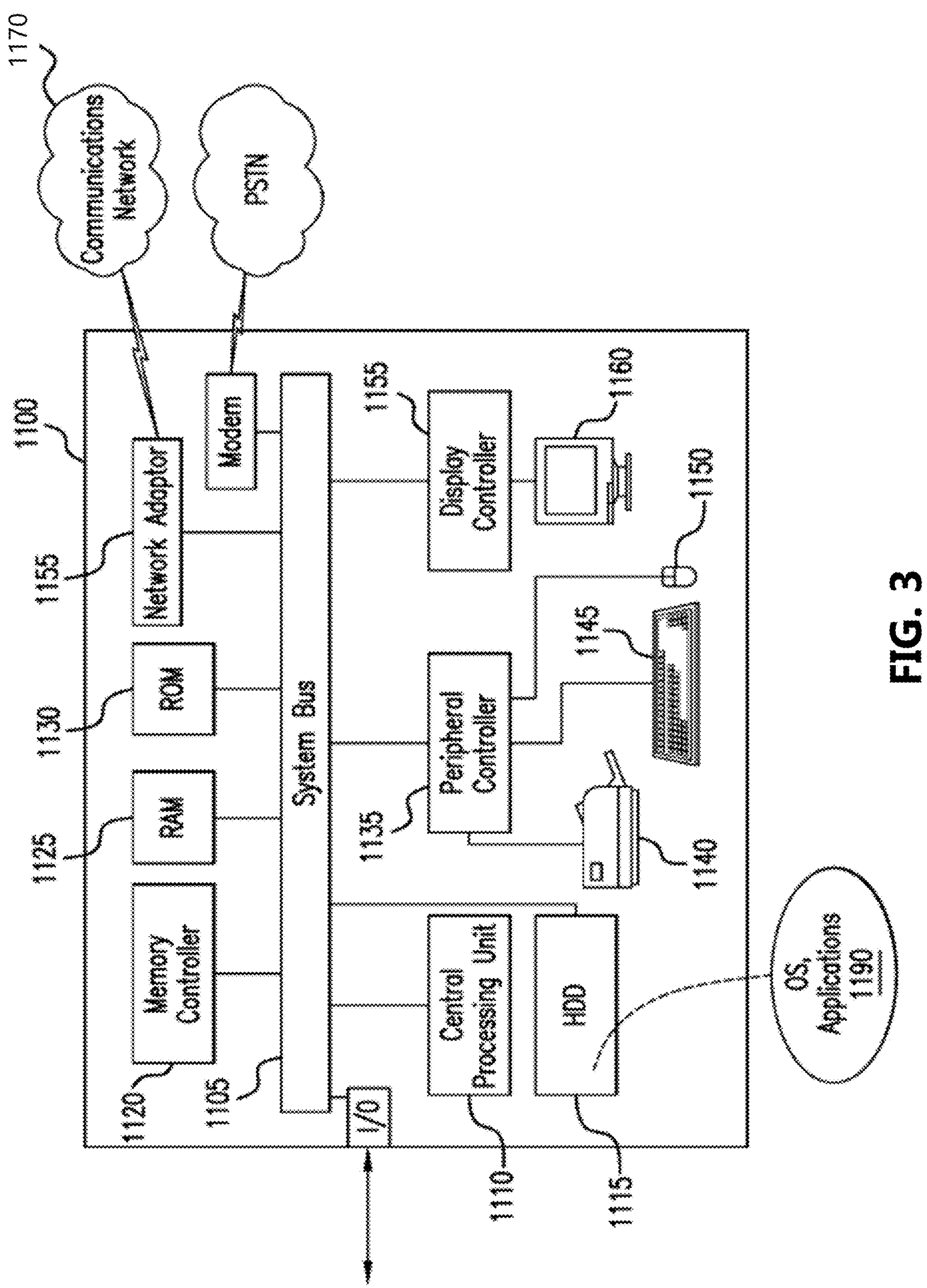
FIG. 3 illustrates an exemplary computing system.

FIG. 3 depicts an exemplary computing and control system 1100 for use in association with the herein described systems and methods. Computing system 1100 is capable of executing software, such as an operating system (OS) and/or one or more computing applications/algorithms 1190, such as applications applying the print plan, monitoring, process controls, process monitoring, and process modifications discussed herein, and may execute such applications 1190 using data, such as materials and process-related data, which may be stored 1115 locally or remotely.

More particularly, the operation of an exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software, such as an operating system (OS), executable programs such as the aforementioned correlation applications, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 1135, which is responsible for communicating instructions from CPU 1110 to, and/or receiving data from, peripherals, such as peripherals 1140, 1145, and 1150, which may include printers, keyboards, and/or the sensors discussed herein throughout. An example of a peripheral bus is the Peripheral Component Interconnect (PCI) bus.

Display 1160, which is controlled by display controller 1155, may be used to display visual output and/or other presentations generated by or at the request of computing system 1100, such as in the form of a GUI, responsive to operation of the aforementioned computing program(s). Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, a short range wireless communication technology, such as Bluetooth®, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the inventive concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. An apparatus for printing an additive manufactured object the apparatus comprising a control system comprising one or more print plans:

first and second powdered polymers on a print bed;

a dispersing head suitable to selectively disperse a heat-actuated agent onto the first and second powdered polymers in a shape or to a depth according to the one or more print plans, configured to actuate at least one of the first and second powdered polymers;

a broadband infrared energy source suitable to pass over the print bed so as to actuate the dispersed heat-actuated agent to thus form a desired pattern of the print plan in the first and second powder polymers;

a heat energy filter comprising two or more band pass filters, interfaced to the broadband infrared energy source, comprising an automatically adjustable filter rotatable about a center axis wherein the automatically adjustable filter is automatically adjusted based on the one or more print plans or a manual pre-print entry, to provide filtering at different wavelengths in which a combination of the heat-actuated agent and at least one of the first or second powdered polymers are sensitive to so as to provide an actuation of the dispersed heat-actuated agent and associated at least one first or second powdered polymers to form the desired pattern of the one or more print plans.

2. The apparatus of claim 1, wherein at least one of the first and second powdered polymers comprises polyamides.

3. The apparatus of claim 1, wherein the heat energy filter is insulated or cooled.

4. An apparatus for additive manufacturing, comprising:

a control system comprising one or more print plans;

first and second powdered polymers on a print bed;

a dispersing head suitable to disperse a heat-actuated agent onto the first and second powdered polymers in a shape or to a depth as executed by the one or more print plans, configured to actuate at least one of the first and second powdered polymers;

a broadband infrared energy source suitable to pass over the print bed so as to actuate the dispersed heat-actuated agent to thus form a desired pattern of the one or more print plans in the first and second powdered polymers; and a heat energy filter comprising two or more band pass filters, interfaced to the broadband infrared energy source, comprising a filter rotated by manual means about a center axis to rotational positions identified by markings associated with providing filtering at different wavelengths in which a combination of the heat-actuated agent and at least one of the first or second powdered polymers are sensitive to so as to provide an actuation of the dispersed heat-actuated agent and associated at least one first or second powdered polymers to form the desired pattern of the one or more print plans.

5. The apparatus of claim 4, wherein the heat energy filter is actively cooled.

6. The apparatus of claim 4, wherein the heat energy filter is cooled with one or more cooling fans.

7. The apparatus of claim 4, wherein the heat energy filter is insulated.

* * * * *